United States Patent
Chin

(10) Patent No.: US 10,378,638 B2
(45) Date of Patent: Aug. 13, 2019

(54) BICYCLE SPROCKET

(71) Applicant: TIEN HSIN INDUSTRIES CO., LTD., Taichung (TW)

(72) Inventor: Chih-Chung Chin, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 161 days.

(21) Appl. No.: 15/623,559

(22) Filed: Jun. 15, 2017

(65) Prior Publication Data

US 2018/0363752 A1    Dec. 20, 2018

(51) Int. Cl.
*F16H 55/30*    (2006.01)
*B62M 9/00*    (2006.01)

(52) U.S. Cl.
CPC ............... *F16H 55/30* (2013.01); *B62M 9/00* (2013.01)

(58) Field of Classification Search
CPC .................................. F16H 55/30; B62M 9/00
See application file for complete search history.

(56) References Cited

U.S. PATENT DOCUMENTS

| | | | |
|---|---|---|---|
| 2013/0139642 A1* | 6/2013 | Reiter ..................... | B62M 9/105 74/594.2 |
| 2014/0338494 A1* | 11/2014 | Sugimoto ................ | B62M 1/36 74/594.2 |
| 2014/0364259 A1* | 12/2014 | Reiter ..................... | F16H 55/30 474/155 |
| 2015/0198231 A1* | 7/2015 | Emura .................... | B62M 9/105 474/156 |
| 2015/0226306 A1* | 8/2015 | Pfeiffer .................. | B62M 9/105 474/152 |
| 2015/0226307 A1* | 8/2015 | Pfeiffer ..................... | F16H 7/06 474/152 |
| 2015/0226308 A1* | 8/2015 | Pfeiffer .................. | B62M 9/105 474/152 |
| 2015/0285363 A1* | 10/2015 | Pfeiffer .................... | F16H 55/30 474/152 |
| 2016/0238122 A1* | 8/2016 | Medaglia ................ | F16H 55/12 |
| 2017/0016524 A1* | 1/2017 | Cheng ...................... | F16H 55/30 |
| 2017/0101159 A1* | 4/2017 | Watarai .................. | B21K 23/00 |
| 2017/0146109 A1* | 5/2017 | Reiter ..................... | B62M 9/105 |
| 2017/0283005 A1* | 10/2017 | Inoue ................... | B62M 9/1346 |

(Continued)

*Primary Examiner* — Michael R Mansen
*Assistant Examiner* — Mark K Buse
(74) *Attorney, Agent, or Firm* — WPAT, PC

(57) ABSTRACT

A sprocket includes a sprocket body, first and second teeth alternatively arranged radially around an outer periphery of the sprocket body, a driving and a non-driving sides respectively defined on the first and second teeth in the driving direction and the non-driving direction, a recess defined between each first tooth and one adjacent second tooth, the first and second teeth each having a first or second tooth tip, a first groove and a second groove respectively extended from sprocket body to the first tooth tips of each two adjacent first teeth and form a thickness of said first teeth, that said first teeth is axially wider than said second teeth. Each first tooth includes two first front chamfers respectively disposed on the said first tooth flank of said two opposite radial surfaces and located on the intersection of said drive side of said each first tooth and said first and second grooves of said sprocket body. In order to avoid friction between the first teeth and the inner link plates while the sprocket is rotated by the chain.

11 Claims, 9 Drawing Sheets

(56) References Cited

U.S. PATENT DOCUMENTS

2018/0178880 A1* 6/2018 Akanishi .................. B62M 9/10
2018/0180157 A1* 6/2018 Akanishi ................. F16H 55/30
2018/0290712 A1* 10/2018 Taniguchi ................ B62M 9/12

* cited by examiner

BICYCLE SPROCKET

BACKGROUND OF THE INVENTION

1. Field of the Invention

The present disclosure relates to sprocket technology and more particularly, to a sprocket for bicycle, which prevents friction between the inner link plates and rollers of the chain and the sprocket teeth of the sprocket upon rotation of the sprocket to move the chain, avoiding generation of noises.

2. Description of the Related Art

Referring to FIGS. 1-4, a bicycle sprocket 1 is configured for the mounting of a bicycle chain 2. The sprocket 1 comprises a plurality of thick teeth 1a and a plurality of thin teeth 1b alternatively arranged in series around the outer periphery thereof, a first radial surface and a second radial surface located at two opposite sides, a recess 1c defined between each thick tooth 1a and each adjacent thin tooth 1b, a driving side 1d and a non-driving side 1e defined on each of two opposite sides of each thick tooth 1a to face the respective two adjacent thin teeth 1b. Further, two front angle-turning surfaces 1f are defined on the driving side 1d of each thick tooth 1a corresponding to the two radial surfaces of the sprocket 1, and two rear angle-turning surfaces 1g are defined on the non-driving side 1e of each thick tooth 1a corresponding to the two radial surfaces of the sprocket 1.

The chain 2 comprises pairs of outer link plates 2a, pairs of inner link plates 2b, a plurality of rollers 2c and a plurality of pins 2d. The rollers 2c are clipped between the pairs of inner link plates 2b, which are engaged between the pairs of outer link plates 2a, and the pivotally connect with the pins 2d. More clearly, the pairs of outer link plates 2a have first and second ends, and the pairs of inner link plates 2b have first and second ends. The respective rollers 2c pivotally connect the second end of the outer link plates 2a to the respective first end of the respective inner link plates 2b, and the first end of the outer link plate 2a to the respective second end of the respective inner link plates 2b. Thus, a series of large chain slots 2e and small chain slots 2f are alternatively defined in the chain 2.

The thick teeth 1a are adapted to engage with the large chain slots 2e, thin teeth 1b are adapted to engage with the small chain slots 2f, and the recesses 1c are adapted to receive the rollers 2c. During rotation of the sprocket 1, the chain 2 is driven to move. Since the thick teeth 1a are axially wider than the rollers 2c, the front and second ends of the inner link plates 2b will rub against the front angle-turning surfaces 1f and the rear angle-turning surfaces 1g and the rollers 2c will peripherally rub against the thin teeth 1b upon rotation of the sprocket 1 and the chain 2 would produce wear and making noises.

SUMMARY OF THE INVENTION

The present disclosure has been accomplished under the circumstances in view. It is the main object of the present disclosure to provide a sprocket, which prevents friction between the inner link plates and rollers of the chain and the sprocket teeth of the sprocket upon rotation of the sprocket to move the chain, avoiding generation of noises.

To achieve these and other objects of the present disclosure, a sprocket, comprises a sprocket body, a plurality of first teeth and a plurality of second teeth alternatively arranged in series around an outer periphery of the sprocket body, an arc-shaped recess defined between each first tooth and each adjacent second tooth, the first teeth and the second teeth each comprising a driving side in a driving direction upon rotation of the sprocket body and opposing non-driving side in a non-driving direction upon rotation of the sprocket body, each first tooth comprising a first tooth tip located at a top side thereof and remote from the center of the sprocket body, each second tooth comprising a second tooth tip located at a top side thereof and remote from the center of the sprocket body, the first tooth tip being expanded toward the center of the sprocket body to form a first tooth flank, the second tooth tip being expanded toward the center of the sprocket body to form a second tooth flank, a plurality of first grooves located on one radial surface of the sprocket body between each two of adjacent first teeth and a plurality of second grooves located on an opposing radial surface of the sprocket body between each two of adjacent first teeth. Further, the first grooves and the second grooves are respectively extended to the first tooth tips of each two adjacent first teeth so that the first teeth are axially wider than the second teeth.

The first tooth further comprises two first front chamfers respectively located on the driving side thereof corresponding to the two opposite radial surfaces of the sprocket body and respectively disposed in one first groove and one second groove at a front side relative to the first tooth flank of the respective first tooth.

Preferably, each first tooth further comprises two first rear chamfers respectively located on the non-driving side of the first tooth flank thereof corresponding to the two opposite radial surfaces of the sprocket body, and these two first rear chamfers are respectively disposed in another first groove and another second groove at a rear side relative to the first tooth flank of the respective first tooth.

Further, the two first rear chamfers of each first tooth are symmetric and have the same size.

Further, the two first front chamfers of each first tooth are symmetric and have the same size.

Preferably, each second tooth further comprises two second front chamfers respectively located on the driving side of the second tooth flank thereof corresponding to the two opposite radial surfaces of the sprocket body.

Further, the two second front chamfers of each second tooth are symmetric and have the same size.

The disclosure enables the sprocket to be processed to create two first front chamfers on the two opposite lateral sides of the driving side of each first tooth, and two first rear chamfers on the two opposite lateral sides of the non-driving side of each first tooth, avoiding friction between the first end and second end of the inner link plates of the chain and the first tooth flanks of the first teeth. Further, the second tooth flank of each second tooth is processed to provide two second front chamfers near the driving side, and two second rear chamfers near non-driving side, avoiding friction between the rollers and the second tooth flanks of the second teeth to produce noises.

Other advantages and features of the present disclosure will be fully understood by reference to the following specification in conjunction with the accompanying drawings, in which like reference signs denote like components of structure.

DETAILED DESCRIPTION OF THE INVENTION

Figure 1:
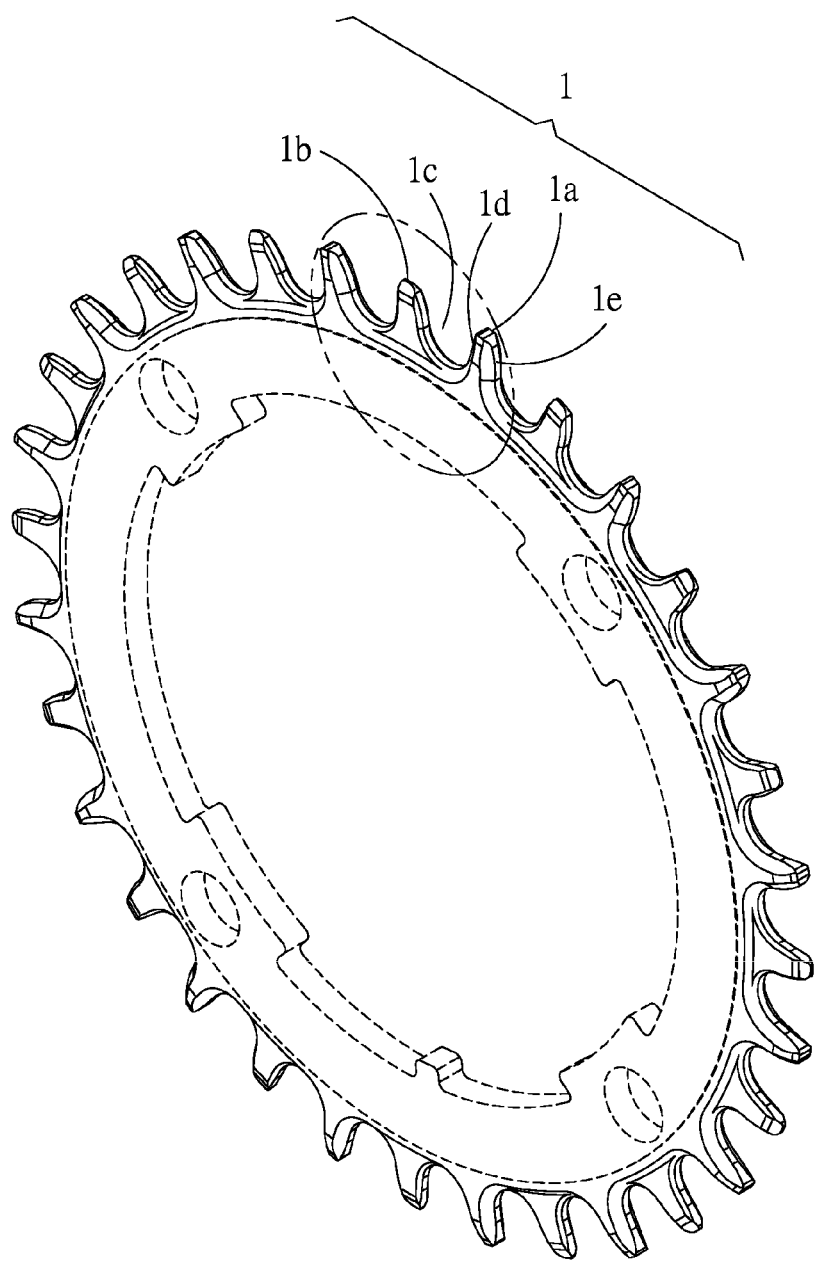
FIG. 1 is an elevational view of a sprocket according to the prior art.
Figure 2:
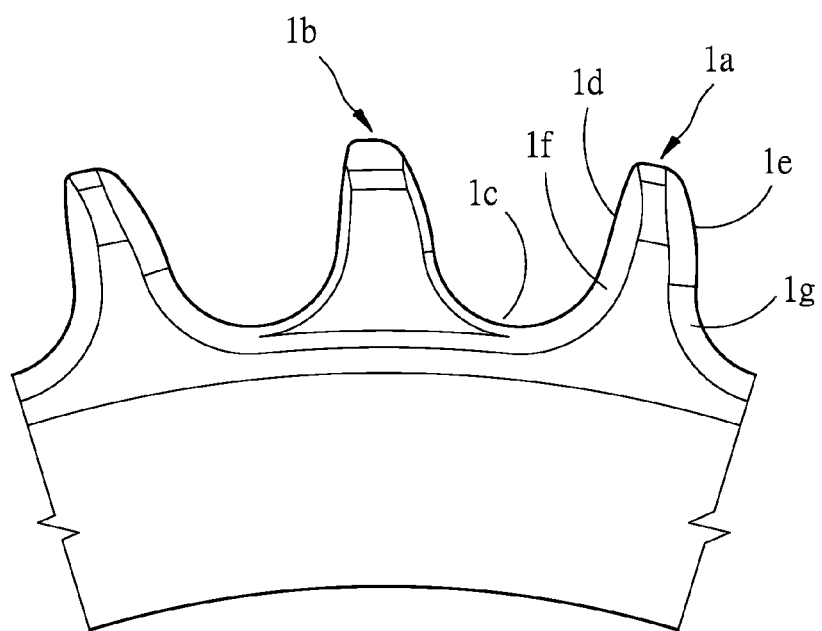
FIG. 2 is a plain view of a part of the sprocket according to the prior art.
Figure 3:
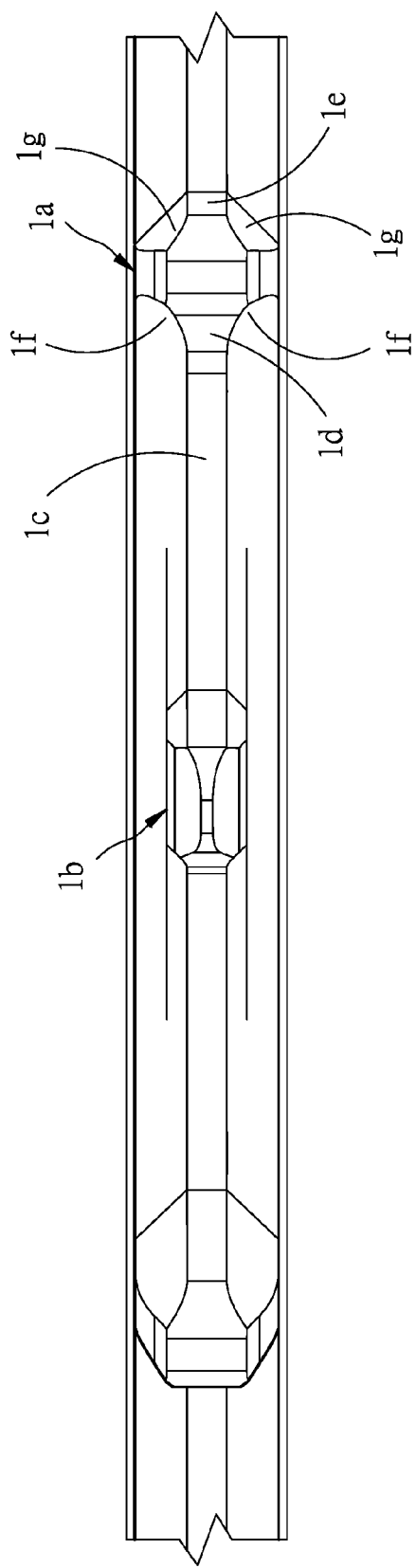
FIG. 3 is a bottom view of the sprocket according to prior art.
Figure 4:
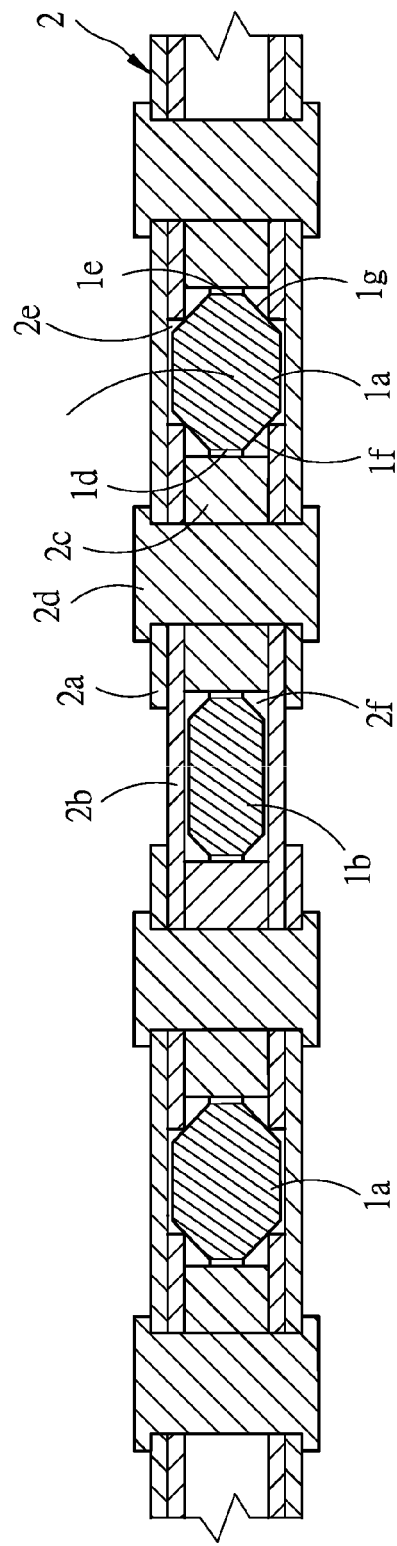
FIG. 4 is a sectional applied view of the prior art, illustrating the sprocket engaged with a mating chain.
Figure 5:
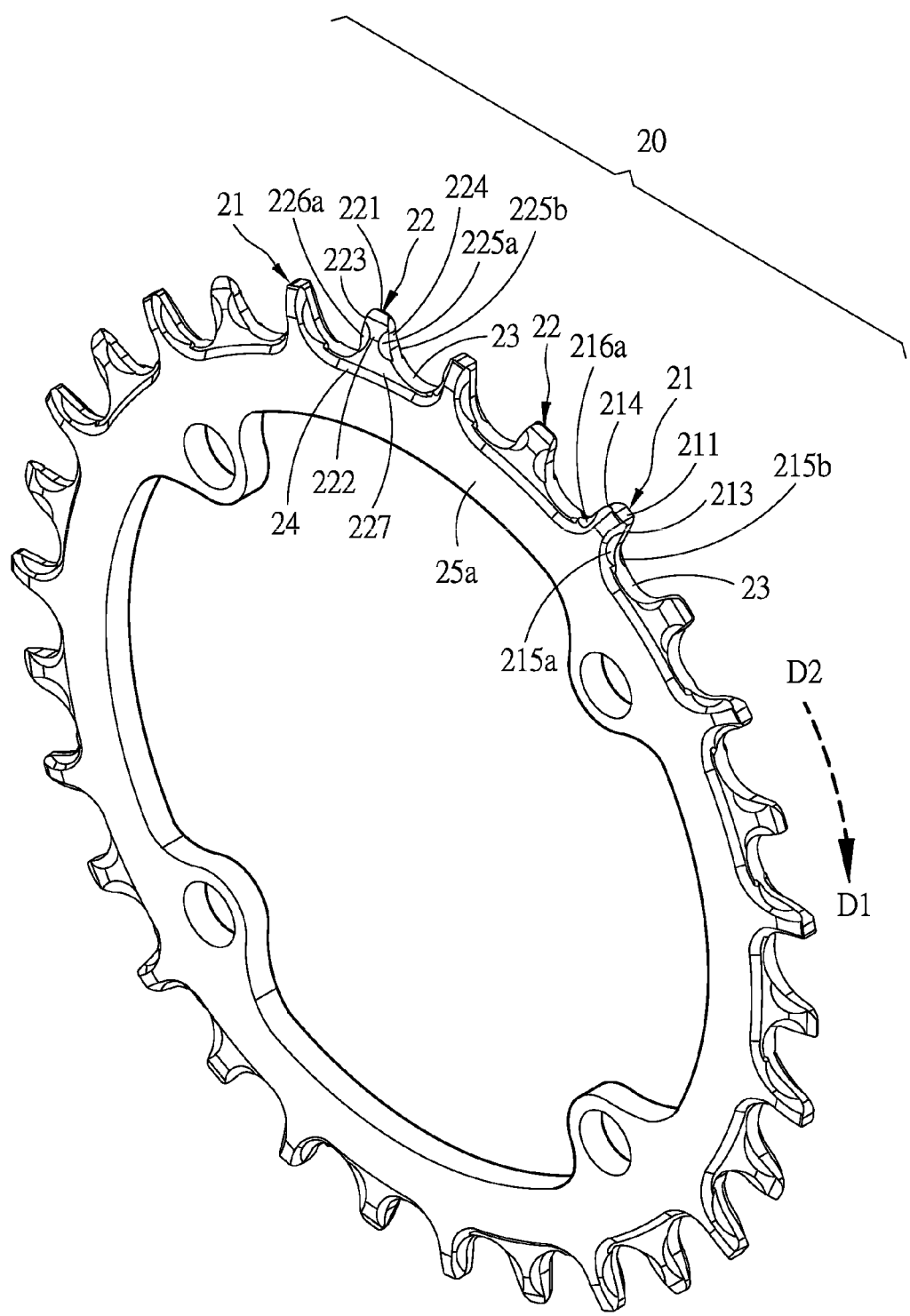
FIG. 5 is an elevational view of a sprocket in accordance with the present disclosure.
Figure 6:
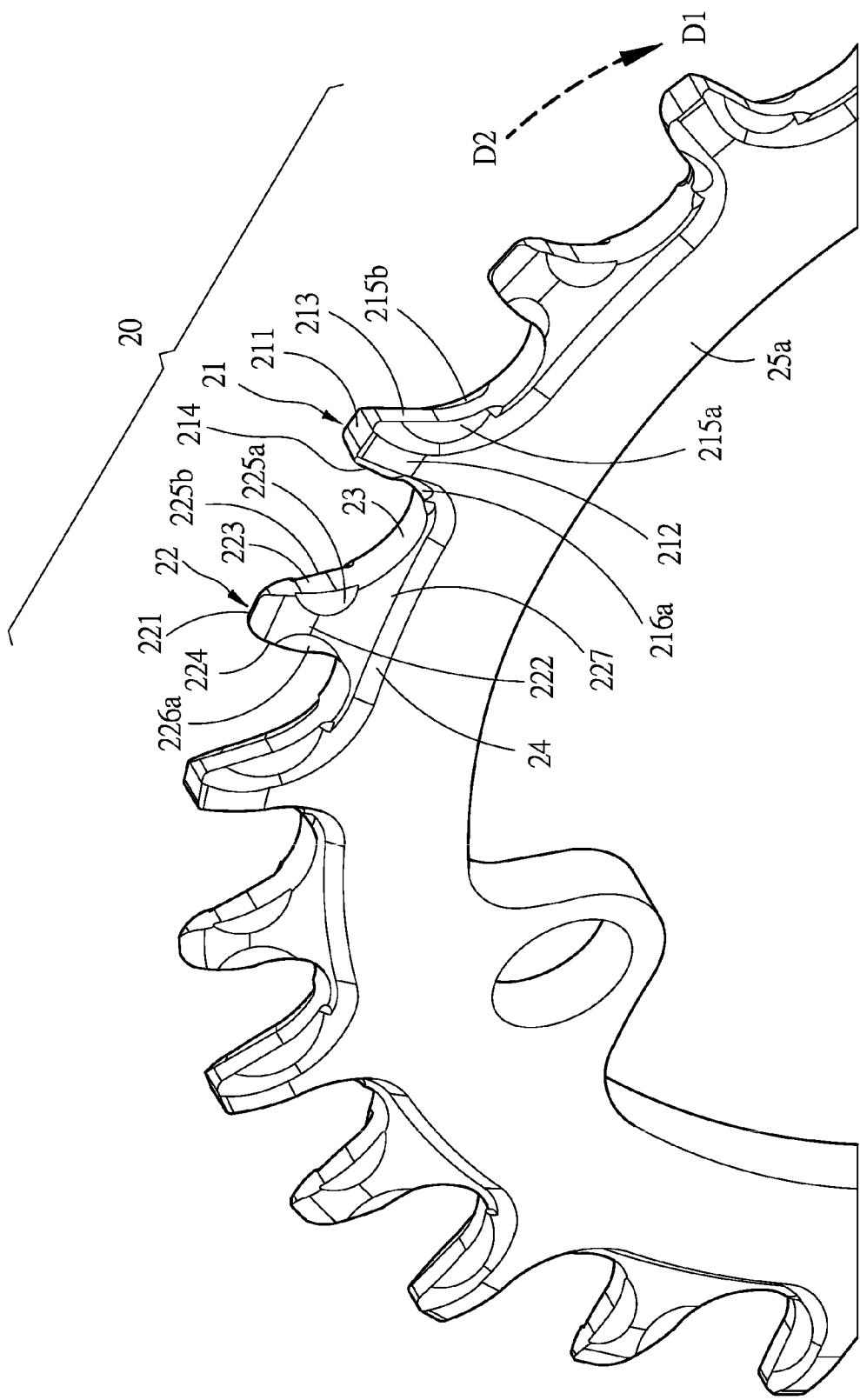
FIG. 6 is an enlarged view of a part of the sprocket in accordance with the present disclosure.
Figure 7:
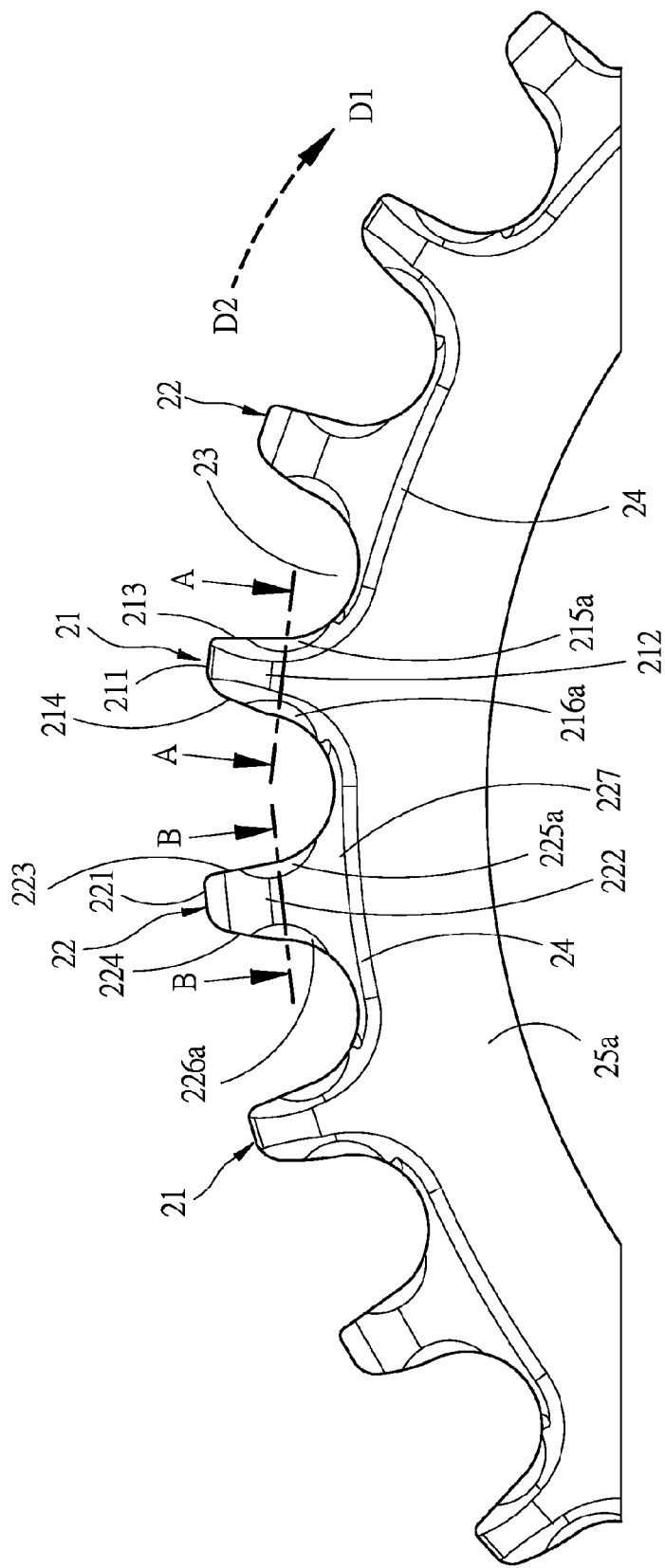
FIG. 7 is a front view of a part of the sprocket in accordance with the present disclosure.
Figure 8A:
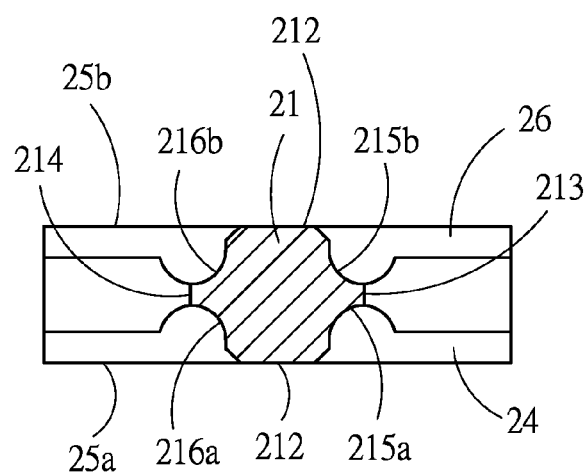
FIG. 8A is a sectional view taken along line A-A of FIG. 7.
Figure 8B:
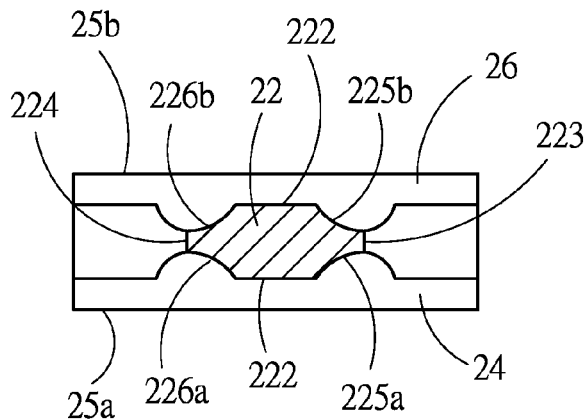
FIG. 8B is a sectional view taken along line B-B of FIG. 7.
Figure 9:
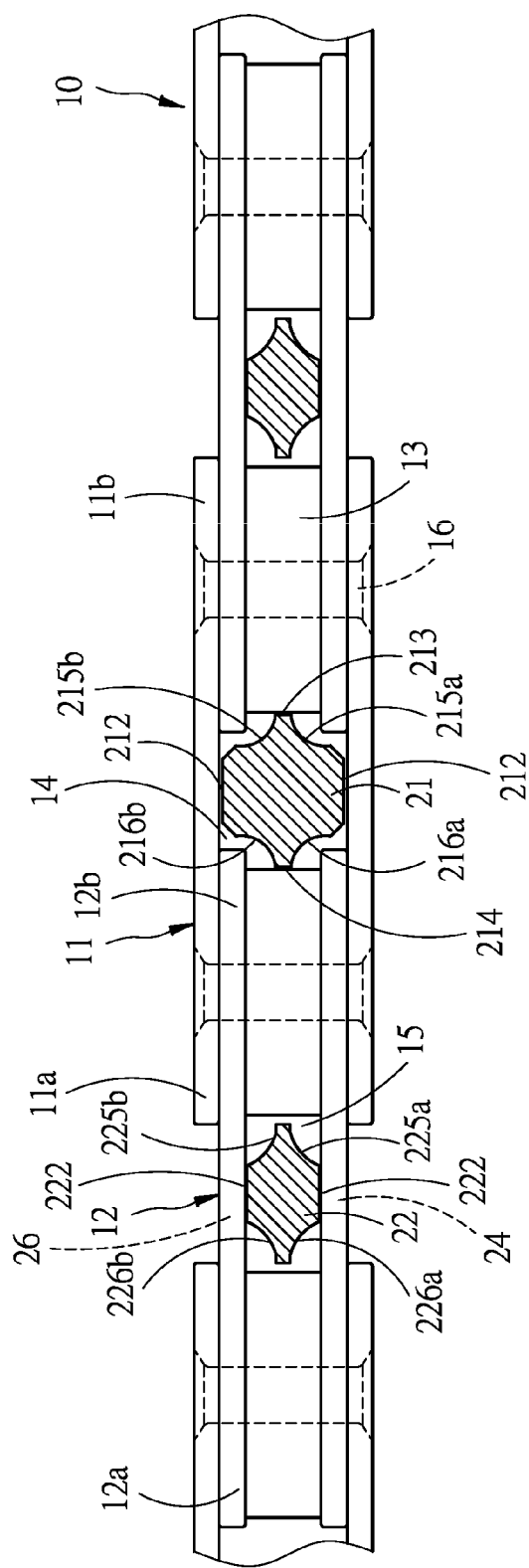
FIG. 9 a sectional applied view of the present disclosure, illustrating the sprocket engaged with a mating chain.

Referring to FIGS. 5-7, 8A, 8B and 9, a sprocket in accordance with the present disclosure is mounted in a bicycle and adapted to receive a chain 10. The chain 10 comprises pairs of outer link plates 11, pairs of inner link plates 12, a plurality of rollers 13, and a plurality of pins 16. The rollers 13 are clipped between the pairs of inner link plates 12, engaged between the pairs of outer link plates 11, and pivotally connect with the pins 16. More clearly, the pairs of outer link plates 11 have first ends 11a and second ends 11b, and the pairs of inner link plates 12 have first ends 12a and second ends 12b. The respective rollers 13 pivotally connect the second ends 11b of the outer link plates 11 to the respective first ends 12a of the respective inner link plates 12, and the first ends 11a of the outer link plates 11 to the respective second ends 12b of the respective inner link plate 12. Thus, a series of large chain slots 14 and small chain slots 15 are alternatively defined in the chain 10.

The sprocket of the present disclosure comprises a sprocket body 20, a plurality of first teeth 21 and a plurality of second teeth 22 alternatively arranged radially around the outer periphery of the sprocket body 20, and an arc-shaped recess 23 defined between each of the first teeth 21 and each of the second teeth 22. The sprocket rotates radially in a direction from D2 to D1, in other words, from a driving direction to a non-driving direction. Each of the first teeth 21 and the second teeth 22 comprises a driving side 213 and a non-driving side 214 respectively corresponding to the directions D1 and D2. Each of the first teeth 21 and the second teeth 22 respectively comprises a first tooth tip 211 and a second tooth tip 221 located on top sides of the first tooth 21 and the second tooth 22 and remote from the sprocket body 20. Further, the first tooth tip 211 and the second tooth tip 221 expand toward the center of the sprocket body 20 and form a first tooth flank 212 and a second tooth flank 222, respectively.

In the present preferred embodiment, the sprocket further comprises a plurality of first grooves 24 located on a radial surface 25a of the sprocket body 20 between each two of the adjacent first teeth 21, and a plurality of second grooves 26 located on an opposing radial surface 25b of the sprocket body 20 between each two of the adjacent first teeth 21. The first groove 24 and the second groove 26 extend through a tooth root 227 of the second tooth 22 between the respective two adjacent first teeth 21. Both of the first groove 24 and second groove 26 comprise two opposite lateral sides thereof extended to the first tooth tips 211 of the respective two adjacent first teeth 21. Further, the first groove 24 slopes toward the radial surface 25a of the sprocket body 20 from the tooth root 227 of the respective second tooth 22, and the second groove 26 slopes toward the radial surface 25b of the sprocket body 20 from the tooth root 227 of the respective second tooth 22. As a result of the arrangement of the first grooves 24 and the second grooves 26, the first teeth 21 are axially wider than the second teeth 22.

In the present preferred embodiment, the sprocket body 20 is rotated in a clockwise direction. The first teeth 21 each comprises a non-driving side 214 and a driving side 213 respectively disposed corresponding to the non-driving direction D2 and the driving direction D1. On the driving side 213, the first teeth 21 each further comprises two first front chamfers 215a, 215b, which are disposed respectively at the first tooth flank 212 on the two opposite radial surfaces 25a, 25b of the sprocket body 20. More specifically, the two first chamfers 215a, 215b are located on an intersection of the first and second grooves 24, 26 and the driving side 213 of each first tooth 21. On the non-driving side 214, the first teeth 21 each further comprises two first rear chamfers 216a, 216b, which are respectively defined by the first tooth flank 212 that disposed on the two opposite radial surfaces 25a, 25b of the sprocket body 20. More clearly, the two first chamfers 216a, 216b are located on an intersection of the first and second grooves 24, 26 and the non-driving side 214 of each first tooth 21. The two first front chamfers 215a, 215b are symmetric and have the same size; and the two first rear chamfers 216a, 216b are symmetric and have the same size, wherein, the two first chamfers 215a, 215b and the two first rear chamfers 216a, 216b can be curve-shaped chamfers.

The second teeth 22 each comprise a non-driving side 224 and a driving side 223 respectively disposed corresponding to the non-driving direction D2 and the driving direction D1. On the driving side 223, the second teeth 22 each further comprises two second front chamfers 225a, 225b, which are respectively located at the second tooth flank 222 of the two opposite radial surfaces 25a, 25b on the sprocket body 20. And on the non-driving side 224, the second teeth 22 each further comprises two second rear chamfers 226a, 226b that are respectively defined by the second tooth flank 222 located on the two opposite radial surfaces 25a, 25b of the sprocket body 20. The two second front chamfers 225a, 225b are symmetric and have the same size, and the two second rear surface 226a, 226b are symmetric and have the same size, wherein the two first chamfers 215a, 215b and the two first rear chamfers 216a, 216b can be curve-shaped chamfers.

Referring to FIGS. 5, 7, 8A, 8B and 9, when the sprocket body 20 is rotated after the chain 10 is mounted thereto, the chain 10 is driven to move. At this time, the large chain slots 14 are hung on the first teeth 21, and the small chain slots 15 are hung on the second teeth 22 alternatively. Then the inner link plates 12 are respectively disposed in the first grooves 24 and the second grooves 26 of the sprocket body 20. The first ends 12a and second ends 12b of the inner link plates 12 are respectively clamped on the rollers 13, the rollers 13 mate with the recesses 23 of the sprocket body 20. During rotation of the sprocket body 20, the driving sides 213 of the first teeth 21 and the driving sides 223 of the second teeth 22 force the rollers 13 to move, that is, the chain 10 is driven to rotate in the driving direction, from D2 to D1.

Because the first teeth 21 are axially wider than the rollers 13, the first ends 12a and the second ends 12b of the inner link plates 12 of the chain 10 would rub against the first tooth flanks 212 to produce noises and friction. The present disclosure enables the sprocket to be processed to create two first front chamfers 215a, 215b on the two opposite radial surfaces 25a, 25b of the driving side 213 and two first rear chamfers 216a, 216b on the two opposite radial surfaces 25a,25b of the non-driving side 214 of each first teeth 21 so as to avoid friction between the first ends 12a and second ends 12b of the inner link plates 12 of the chain 10 and the first tooth flanks 212 of the first teeth 21.

Moreover, the second teeth 22 are adapted to engage the small chain slots 15 of the chain 10, and the recesses 23 of the sprocket body 20 are adapted to receive the rollers 13 of the chain 10. In order to prevent the rollers 13 from rubbing peripherally against the second tooth flanks 222 of the second teeth 22 during rotation of the sprocket body 20. The present disclosure is processed to provide two second front chamfers 225a, 225b on the two opposite radial surfaces 25a,25b of the driving side 223, and two second rear chamfers 226a,226b on the two opposite radial surfaces 25a,25b of the non-driving side 224, to avoid friction between the rollers 13 and the second tooth flanks 222 of the second teeth 22 to produce noises.

Although a particular embodiment of the present disclosure has been described in detail for purposes of illustration, various modifications and enhancements may be made without departing from the spirit and scope of the disclosure. Accordingly, the disclosure is not to be limited except as by the appended claims.

What is claimed is:

1. A sprocket, comprising:
a sprocket body;
a plurality of first teeth and a plurality of second teeth, and being alternatively arranged radially around an outer periphery of said sprocket body;
an arc-shaped recess formed between each said first tooth and each adjacent said second tooth;
said first teeth and said second teeth each comprising a driving side in a driving direction and a non-driving side in a non-driving direction upon rotation of said sprocket body;
a first tooth tip being located on a top side of each said first tooth, a second tooth tip located on a top side of each said second tooth, and said first tooth tip and said second tooth tip thereof being remote from the center of said sprocket body;
said first tooth tip being expanded toward the center of said sprocket body to form a first tooth flank, said second tooth tip being expanded toward the center of said sprocket body to form a second tooth flank,
a plurality of first grooves located on a radial surface of said sprocket body between each two of adjacent said first teeth and a plurality of second grooves located on an opposing radial surface of said sprocket body between each two of adjacent said first teeth;
said first grooves and said second grooves being respectively extended to said first tooth tips of each two of adjacent said first teeth to form a thickness of said first teeth, and an axial width of said first teeth is larger than an axial width of said second teeth;
wherein each said first tooth comprises two first front chamfers, said two first front chamfers respectively disposed on the said first tooth flank of said two opposite radial surfaces and located on an intersection of said driving side of said each first tooth and said first and second grooves of said sprocket body,
wherein each said second tooth further comprises two second front chamfers respectively located on said second tooth flank of said driving side corresponding to the two opposite radial surfaces of said sprocket body.

2. The sprocket as claimed in claim 1, wherein each said first tooth further comprises two first rear chamfers respectively disposed on said first tooth flank on said two opposite radial surfaces and located on an intersection of said non-driving side of each said first tooth and said first grooves and said second grooves of said sprocket body.

3. The sprocket as claimed in claim 2, wherein said two first rear chamfers of each said first tooth are symmetric and have the same size.

4. The sprocket as claimed in claim 2, wherein said two first rear chamfers of each said first tooth are curve-shaped chamfers.

5. The sprocket as claimed in claim 1, wherein said two first front chamfers of each said first tooth are symmetric and have the same size.

6. The sprocket as claimed in claim 1, wherein said two first front chamfers of each said first tooth are curve-shaped chamfers.

7. The sprocket as claimed in claim 1, wherein each said second tooth further comprises two second rear chamfers respectively located on said second tooth flank of said non-driving side and corresponding to the two opposite radial surfaces of said sprocket body.

8. The sprocket as claimed in claim 7, wherein said two second rear chamfers of each said second tooth are symmetric and have the same size.

9. The sprocket as claimed in claim 7, wherein said two second rear chamfers of each said second tooth are curve-shaped chamfers.

10. The sprocket as claimed in claim 1, wherein said two second front chamfers of each said second tooth are symmetric and have the same size.

11. The sprocket as claimed in claim 1, wherein said two second rear chamfers of each said second tooth are curve-shaped chamfers.

* * * * *